United States Patent
Parrish et al.

(10) Patent No.: US 8,727,797 B2
(45) Date of Patent: May 20, 2014

(54) RAIL ADAPTER WITH GROUNDING MEANS

(75) Inventors: Jeremy S. Parrish, Frankfort, IL (US); Robert E. Fransen, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 107 days.

(21) Appl. No.: 13/498,166

(22) PCT Filed: Sep. 29, 2010

(86) PCT No.: PCT/US2010/050722
§ 371 (c)(1), (2), (4) Date: May 14, 2012

(87) PCT Pub. No.: WO2011/041413
PCT Pub. Date: Apr. 7, 2011

(65) Prior Publication Data
US 2012/0220144 A1   Aug. 30, 2012

Related U.S. Application Data

(60) Provisional application No. 61/246,824, filed on Sep. 29, 2009.

(51) Int. Cl.
*H01R 4/66* (2006.01)

(52) U.S. Cl.
USPC .......................................................... 439/94

(58) Field of Classification Search
USPC ............ 439/94, 716, 532; 248/229.1, 229.16, 248/229.26, 222.11
See application file for complete search history.

(56) References Cited

U.S. PATENT DOCUMENTS

| | | | |
|---|---|---|---|
| 4,707,563 A | 11/1987 | Conrad et al. | |
| 4,878,859 A | 11/1989 | Haller et al. | |
| 5,192,227 A | 3/1993 | Bales | |
| 5,334,054 A | 8/1994 | Conrad et al. | |
| 5,797,756 A | 8/1998 | Nad | |
| 6,017,251 A * | 1/2000 | Rittmann | 439/716 |
| 6,076,124 A | 6/2000 | Korowitz et al. | |
| 6,356,175 B1 * | 3/2002 | DeGrazia et al. | 335/202 |
| 6,431,909 B1 | 8/2002 | Nolden et al. | |
| 6,650,222 B2 | 11/2003 | Darr et al. | |
| 6,712,641 B2 | 3/2004 | Beege et al. | |
| 7,011,551 B2 | 3/2006 | Johansen et al. | |
| 7,265,966 B2 | 9/2007 | Dudley | |
| 2002/0050890 A1 * | 5/2002 | Gula et al. | 335/202 |
| 2012/0260972 A1 * | 10/2012 | West et al. | 136/251 |
| 2012/0298186 A1 * | 11/2012 | West | 136/251 |

FOREIGN PATENT DOCUMENTS

| | | |
|---|---|---|
| DE | 10249981 B3 | 4/2004 |
| EP | 1248319 A1 | 10/2002 |

* cited by examiner

*Primary Examiner* — Jean F Duverne
(74) *Attorney, Agent, or Firm* — Christopher S. Clancy; Christopher K. Marlow

(57) ABSTRACT

A DIN rail adapter is provided. The DIN rail adapter is comprised of an adapter sub-assembly, a jack/module carrier, and a cam turn tab. The adapter sub-assembly has a grounding bar configured to make contact to the DIN rail when it is mounted. The jack/module earner attaches to the adapter sub-assembly and can be configured to contain a jack, module, or another similar device. The cam turn tab is configured to reversibly connect the grounding bar to the jack or module contained within the jack/module carrier. In one embodiment, the cam turn tab connects the grounding bar to the jack or module by pushing a portion of the grounding bar such that it makes contact with the jack or module within the jack/module carrier.

5 Claims, 15 Drawing Sheets

RAIL ADAPTER WITH GROUNDING MEANS

BACKGROUND

A DIN (Deutsches Institut für Normung e.V., in English, the German Institute for Standardization) rail or top hat rail is a standardized metal rail with a hat-shaped cross section, widely used to mount industrial control and other equipment inside enclosures, racks, etc. DIN rails are used inside water/dust proof cabinets to secure data transferring equipment (switch, hubs, etc.). In addition to water/dust proof cabinets, DIN rails can be installed on racks, walls, and variety of cabinets, which permits flexible installations. DIN rail is a hat-shaped metallic channel designed for consistent, easy and quick installation of electronic devices. It is widely used in industry for building electrical cabinets, and is relatively less expensive and more robust as compared to alternative mounting options.

DIN issued standard EN 50022 for the 35 mm symmetric rail. Standard EN50035 was issued for 32 mm G profile rail. Standard EN 50045 was issued for the 15 mm wide rail. All the mounting rails have been collected together in IEC 715 issued in 1981 and subsequently renumbered IEC 60715. A German version was released as EN 60715:2001.

DIN rail adapters help distribute data to DIN rail mounted equipment. Standard adapters are dedicated with one type of connector mounted inside the adapter; i.e., they are not compatible with modular connectors which can be configured in the field for different connector types such as CAT 5e, CAT 6, CAT 6A, HDMI, USB. etc. These dedicated adapters require that the entire adapter be replaced if a customer migrates from CAT 5e to CAT 6, for example.

Grounding data networks can be a customer a requirement, but grounding sometimes increases noise in the signal being passed through the data line, through the introduction of ground loops, for example. In some cases, selectable grounding in the field is required for a technician to configure a DIN rail system to a particular environment. In many cases, the ground requirement is determined after the adapter is installed in a water/dust proof cabinet. One prior art solution requires the use of a screwdriver to release a grounding tab. In this solution, an RJ45 patch cord connected to the adapter must be removed to allow a user to access the grounding tab with the screwdriver. This configuration does not lend itself to quick and easy grounding.

Another problem in the art is that there is a need to be able to increase the density of connectors in a given enclosure without using additional DIN rail space, which may or may not be available in the given enclosure. If an enclosure has no available DIN rail space, and additional connectors are required for an application, then the enclosure needs to be replaced with a larger enclosure or a second enclosure must be added, both at considerable expense.

DESCRIPTION OF THE INVENTION

Figure 1:
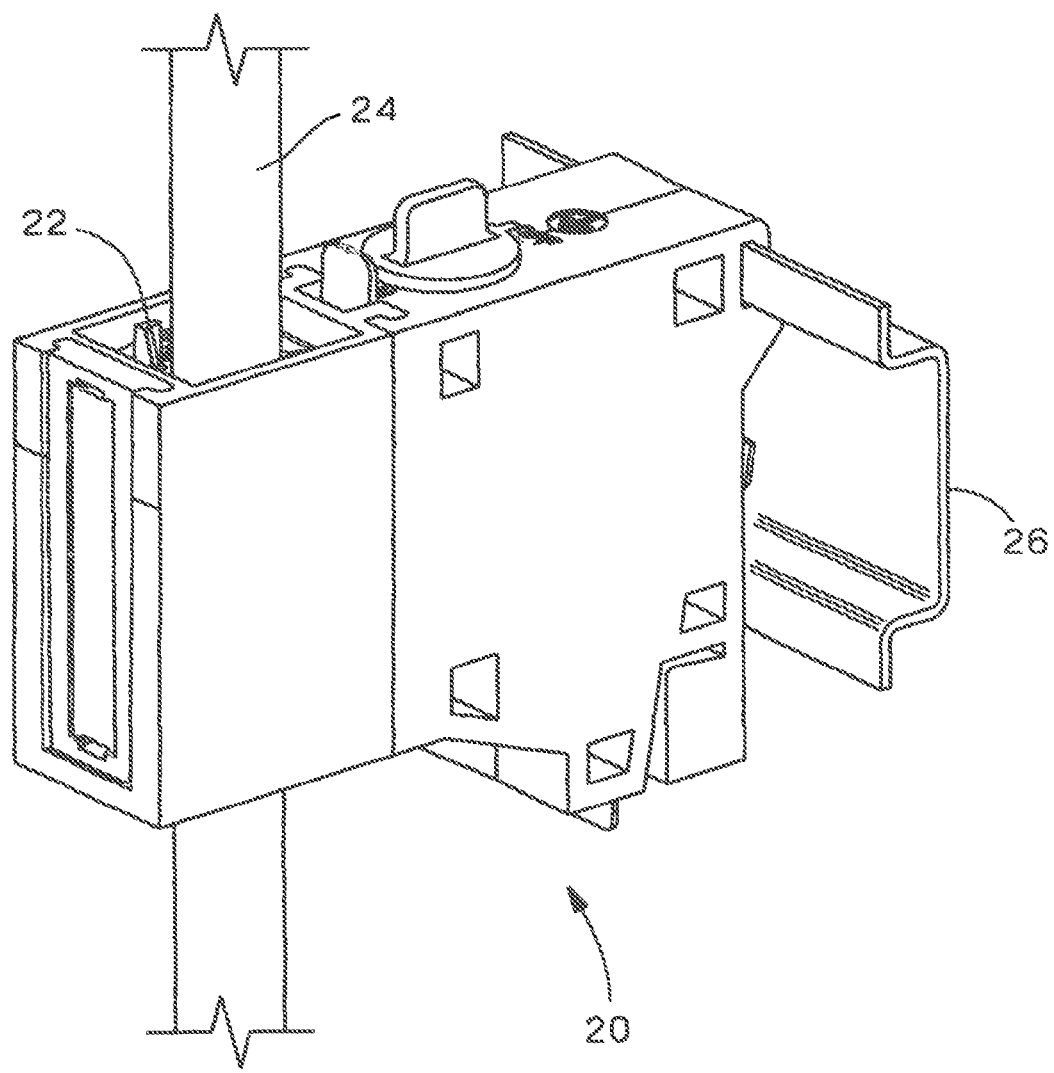
Figure 2:
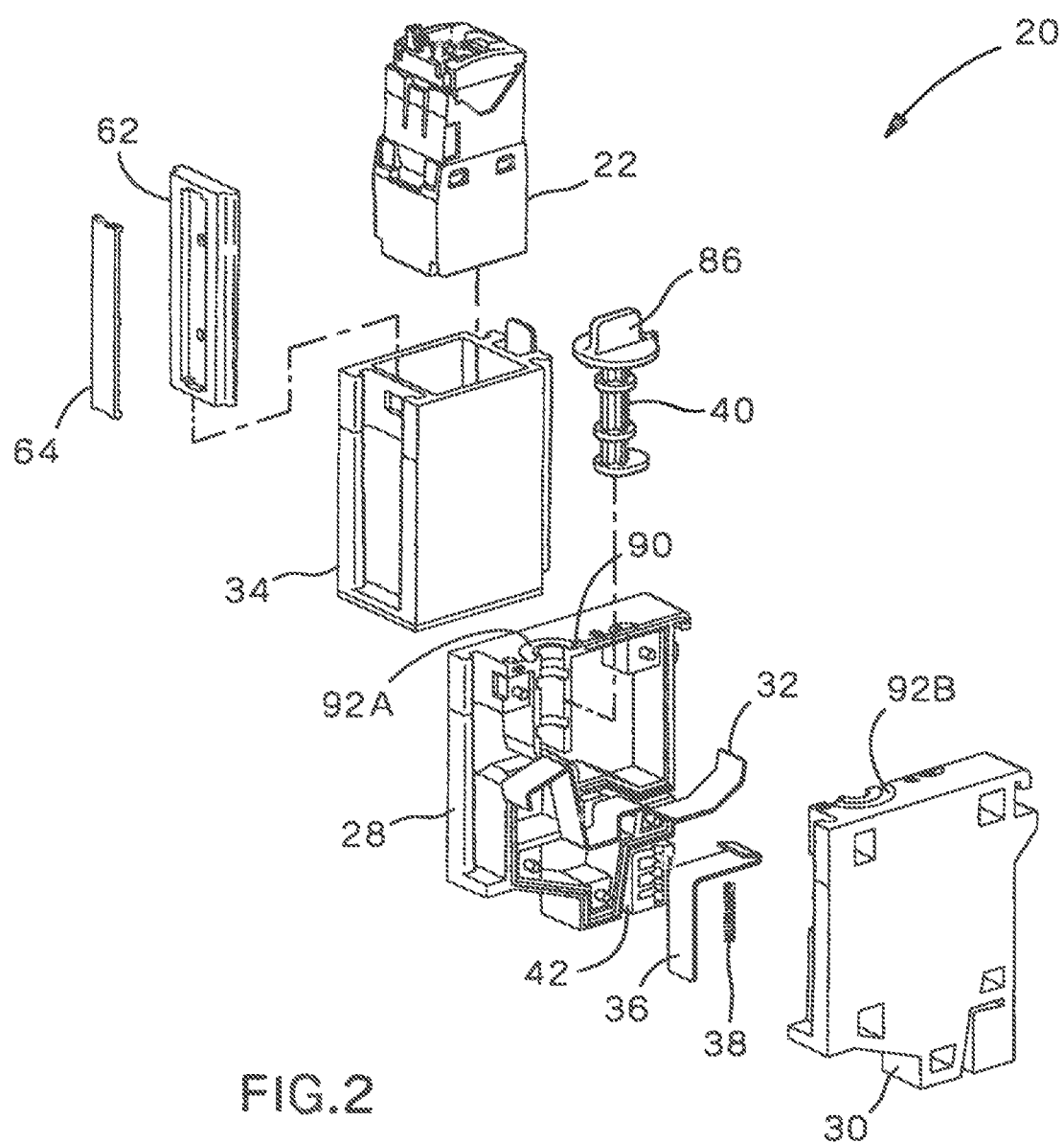

In one embodiment of the present invention, a DIN rail adapter 20 allows the use of jacks/modules 22, connected to data cable 24, on a 35 mm DIN rail 26 as shown in FIG. 1. In the embodiment shown, adapter 20 includes several components assembled together as shown in FIG. 2. Adapter 20 includes a left housing 28, right housing 30, grounding bar 32, jack/module carrier 34, latching arm 36, compression spring 38, and a cam turn tab 40. A jack/module 22 can be snapped into the jack/module carrier 34. The term "jack/module" is used herein to refer to the fact that these elements may be jacks, modules, or modular jacks.

Figure 3:
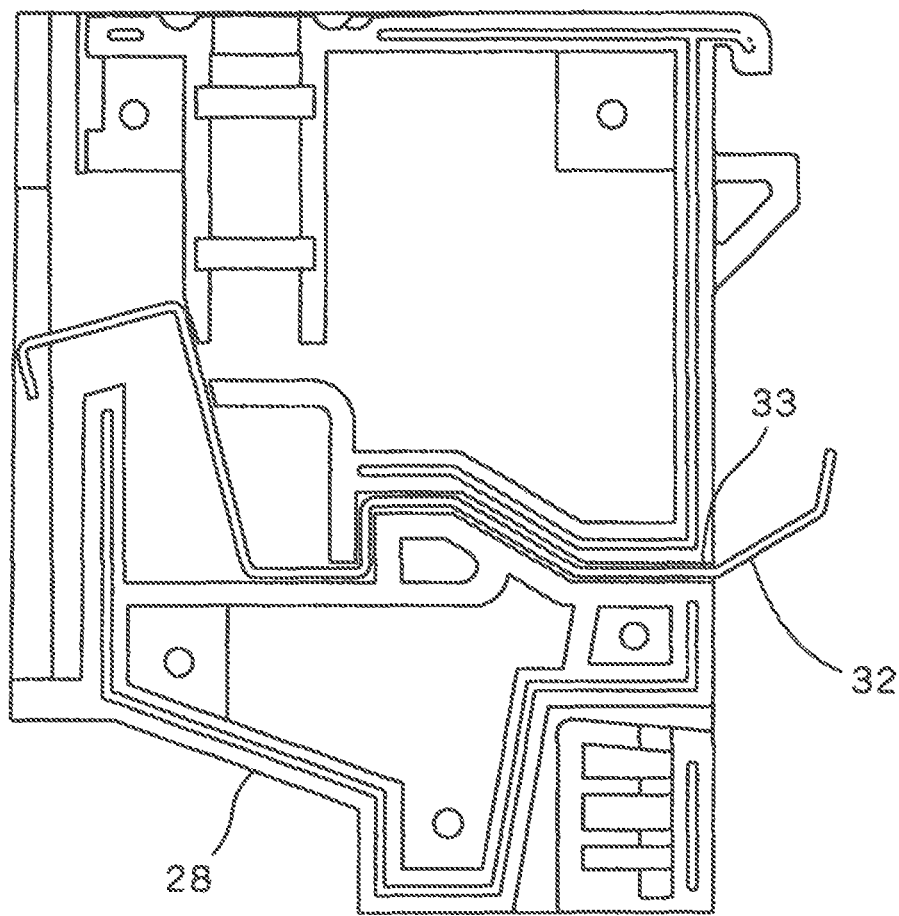
Figure 4:
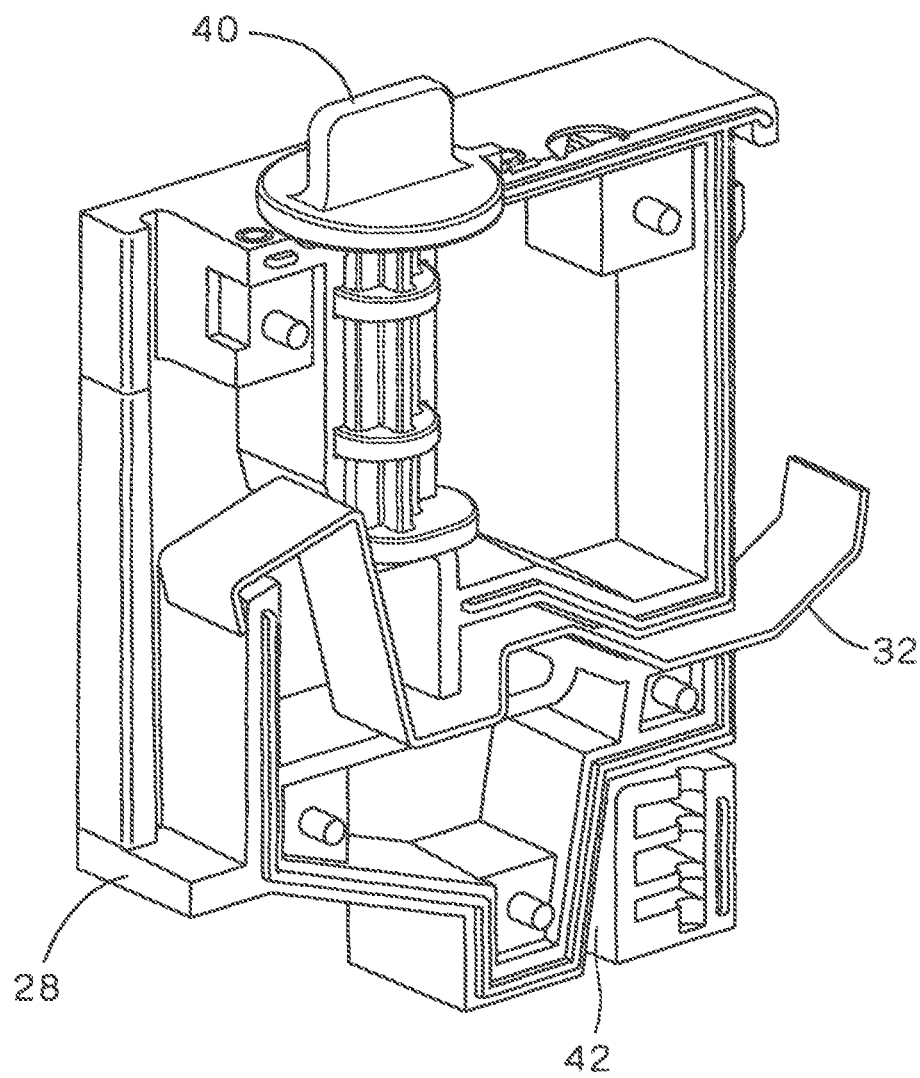
Figure 5:
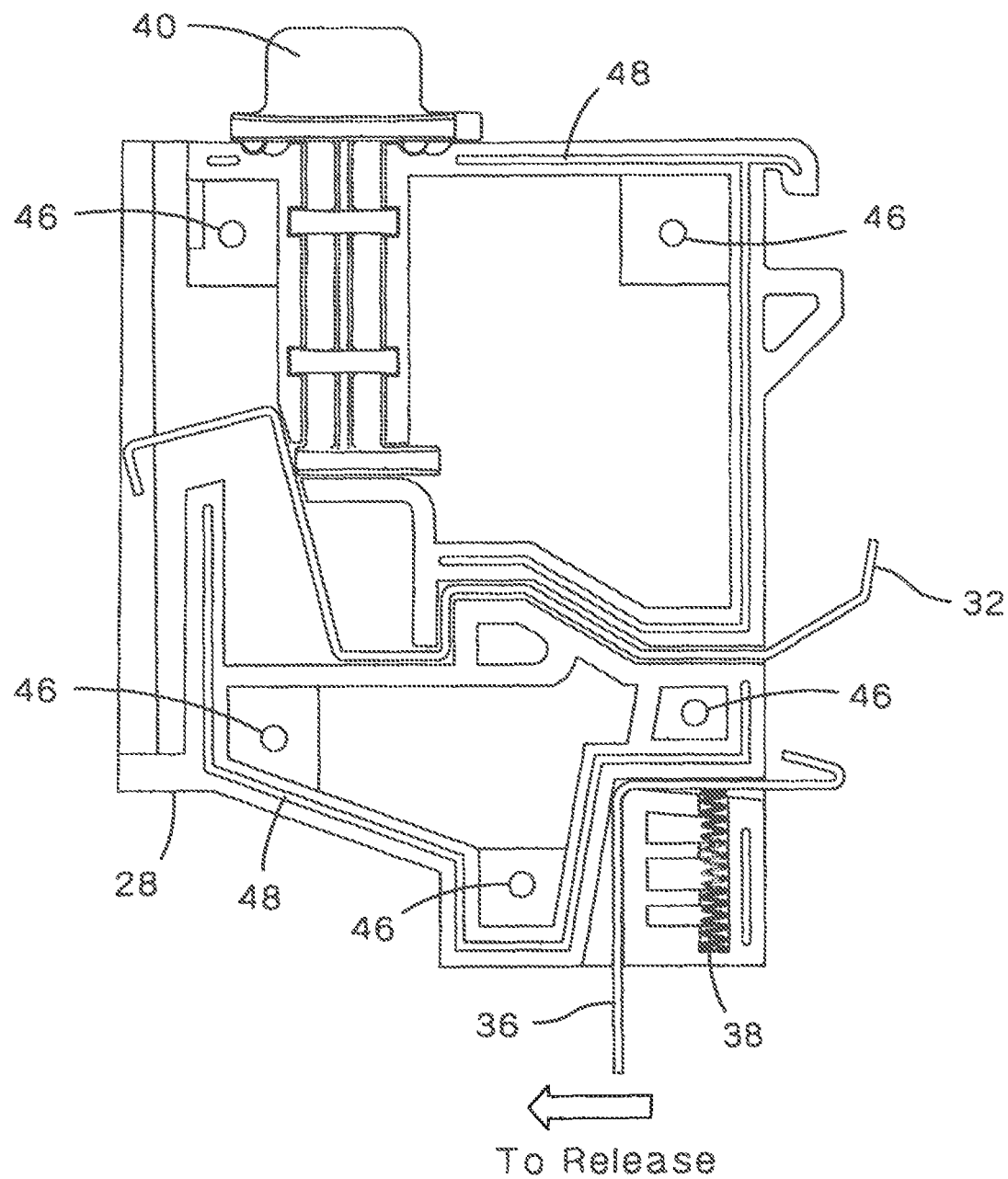
Figure 6:
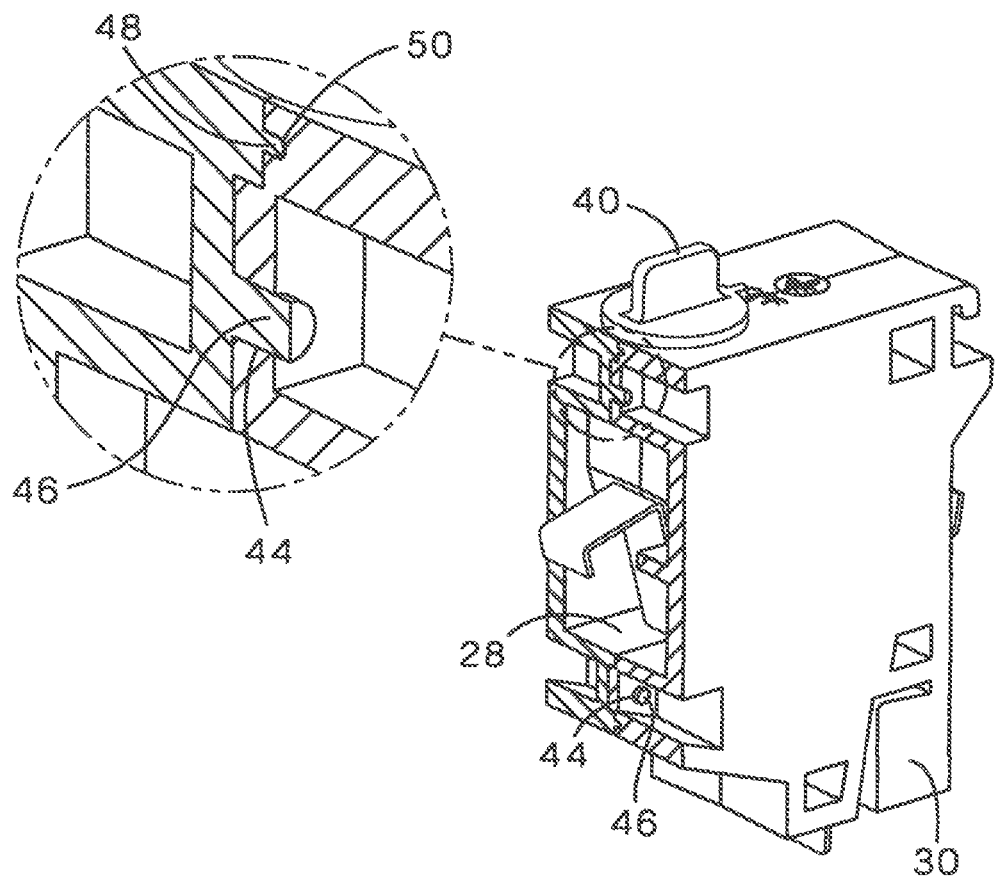
Figure 7:
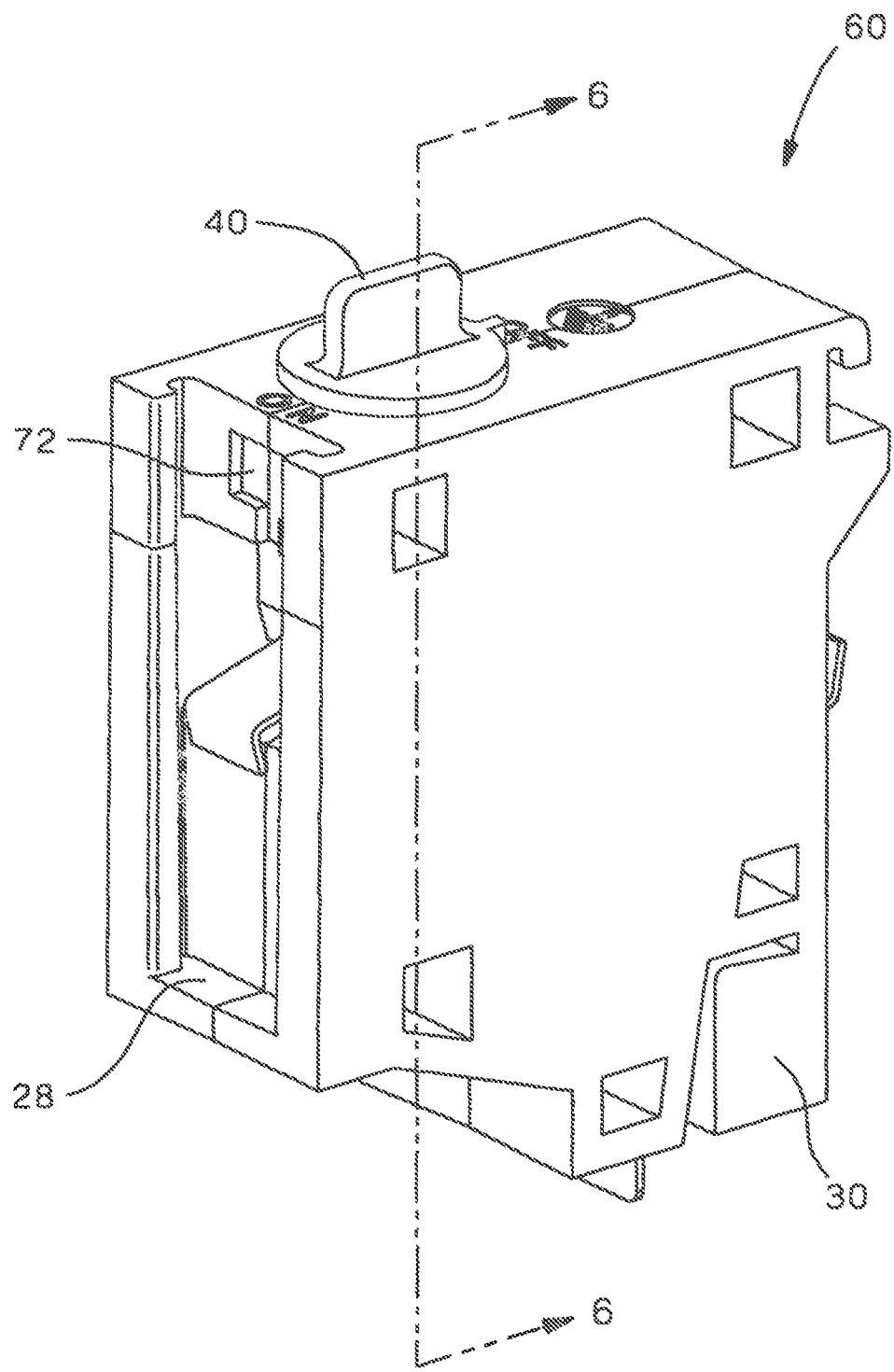

Assembly starts by putting the grounding bar 32 into the built-in groove 33 in the left housing 28. FIG. 3 shows a right side view of the first step showing where the grounding bar 32 is located in the left housing 28. Next, the cam turn tab 40 is set into the left housing 28. FIG. 4 shows a front perspective view of left housing 28 and earn turn tab 40 set into position. Latching arm 36 and compression spring 38 are assembled next. Left housing 28 has a built in slot 42 to receive latching arm 36. Compression spring 38 is squeezed and set into a pocket in the left housing 28. When assembled, compression spring 38 forces latching arm 36 upward to engage into DIN rail 26. FIG. 5 shows a right side view of the latching arm 36 and compression spring 38 in place. Right housing 30 is set into place using five staking holes 44 (in the right housing 30, only one shown, see FIG. 6), five corresponding staking pegs 46, and various channels 48 and grooves 50 help locate and position the two housings together. The two halves will be held together by a cold staking operation. In the staking process, a peg protruding from left housing 28 fits into a hole in the right housing 30. The peg is then deformed through the cold flow of the plastic to form a head which mechanically locks the two components together. A simple hand press process can be used to stake housings 28, 30 together. Assembly is then complete. FIG. 6 shows a sectioned front perspective view with a detail of the staking peg 46 and the mating hole 44. FIG. 7 shows a front perspective view of the DIN rail subassembly 60.

Figure 8:
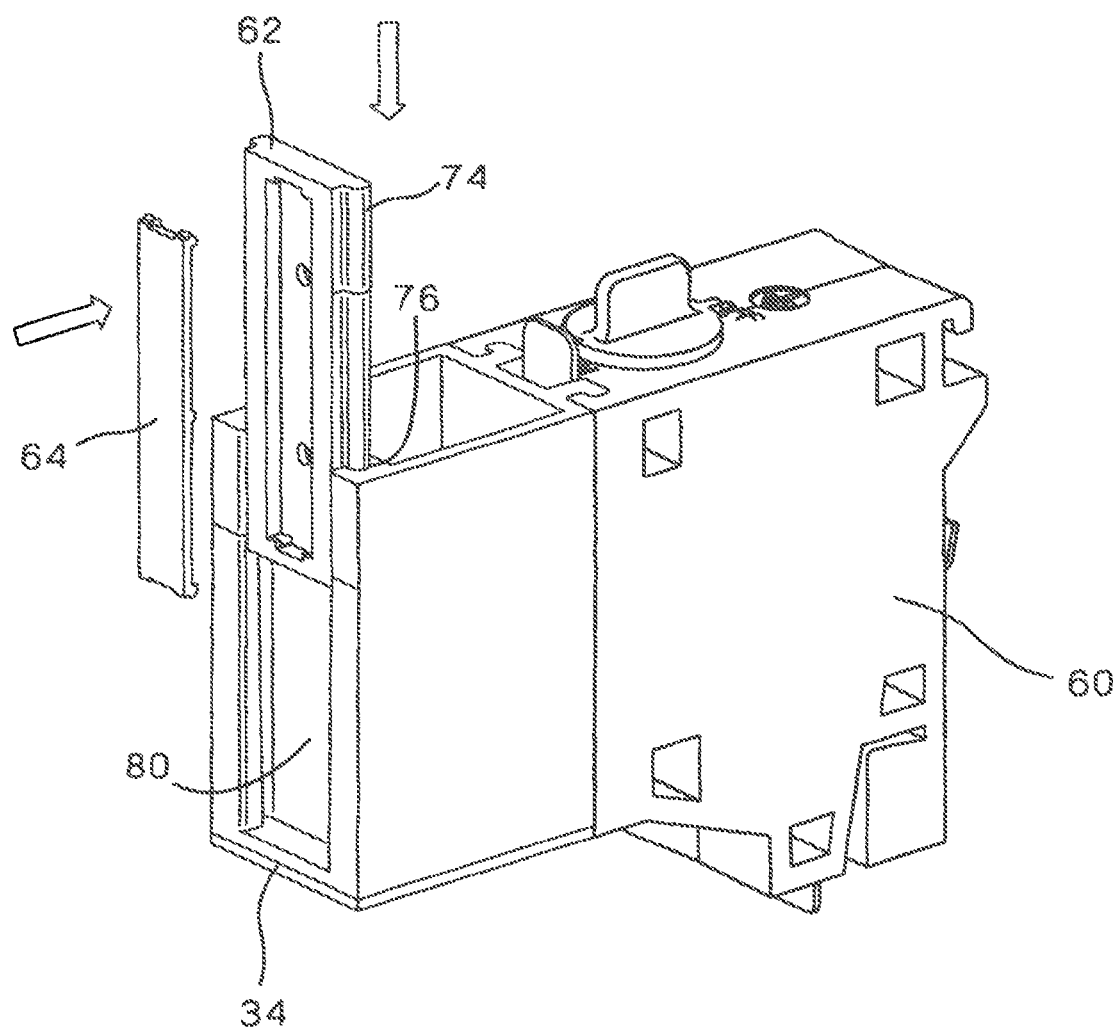
Figure 9:
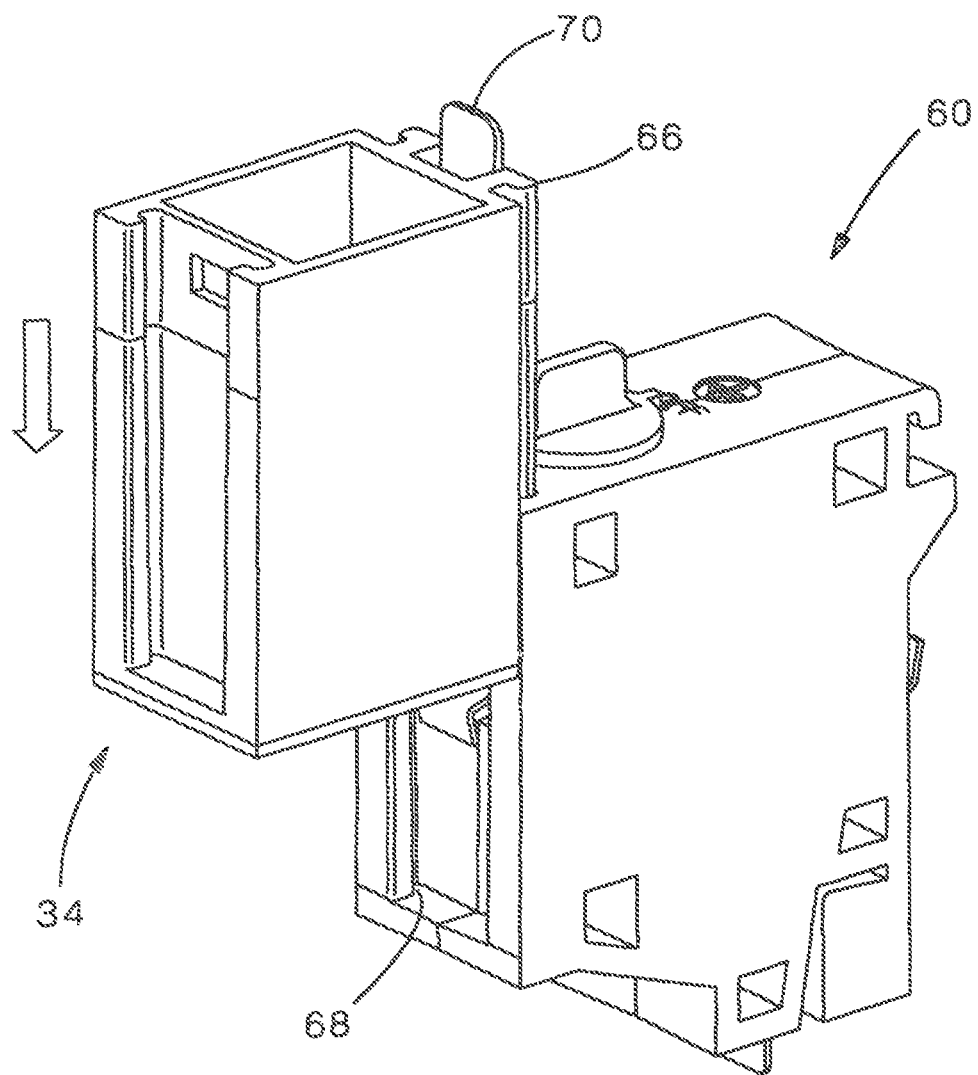
Figure 10:
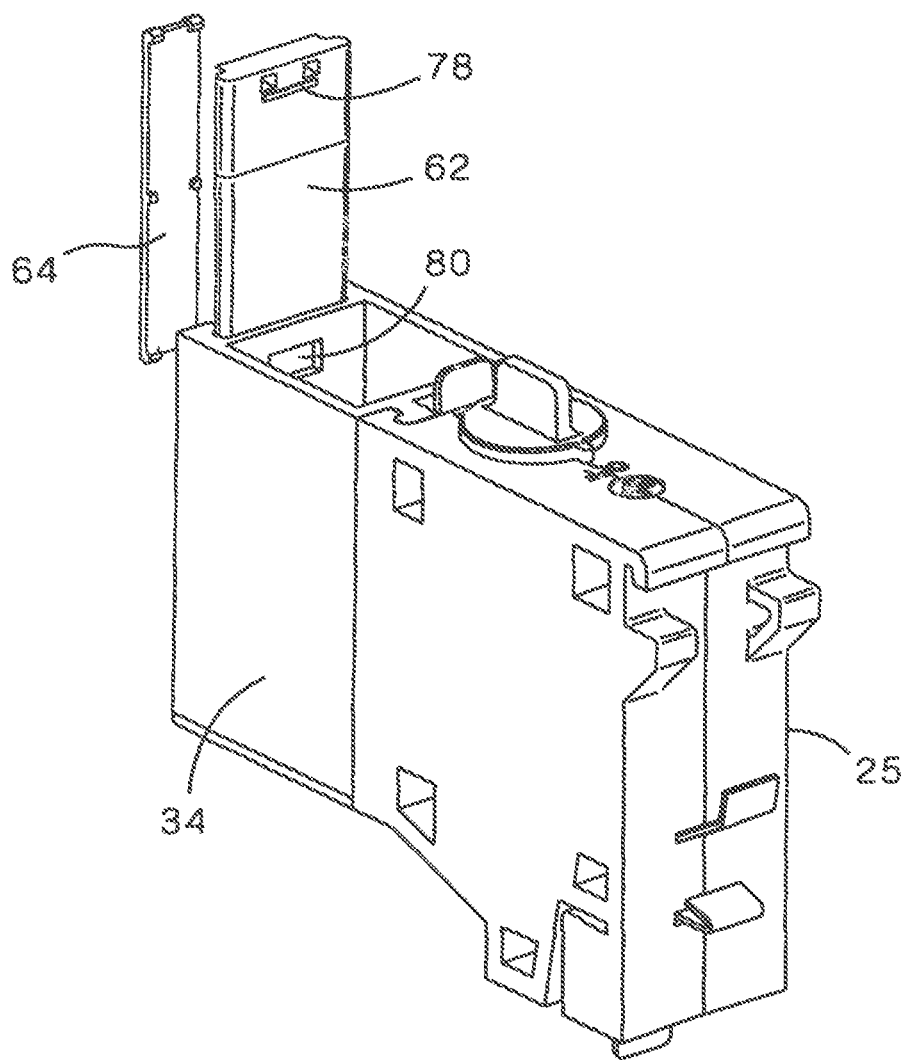
Figure 11:
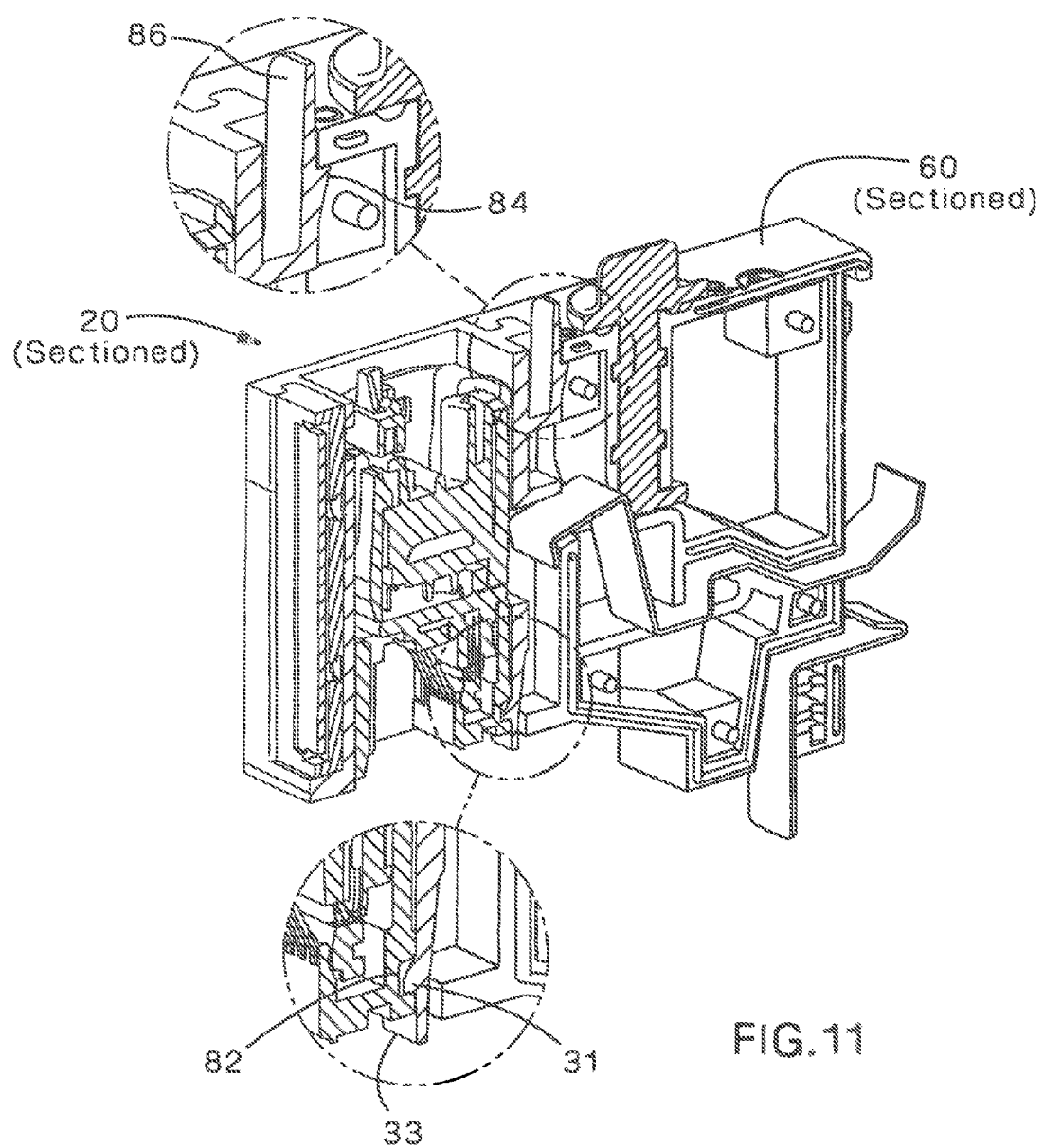
Figure 12:
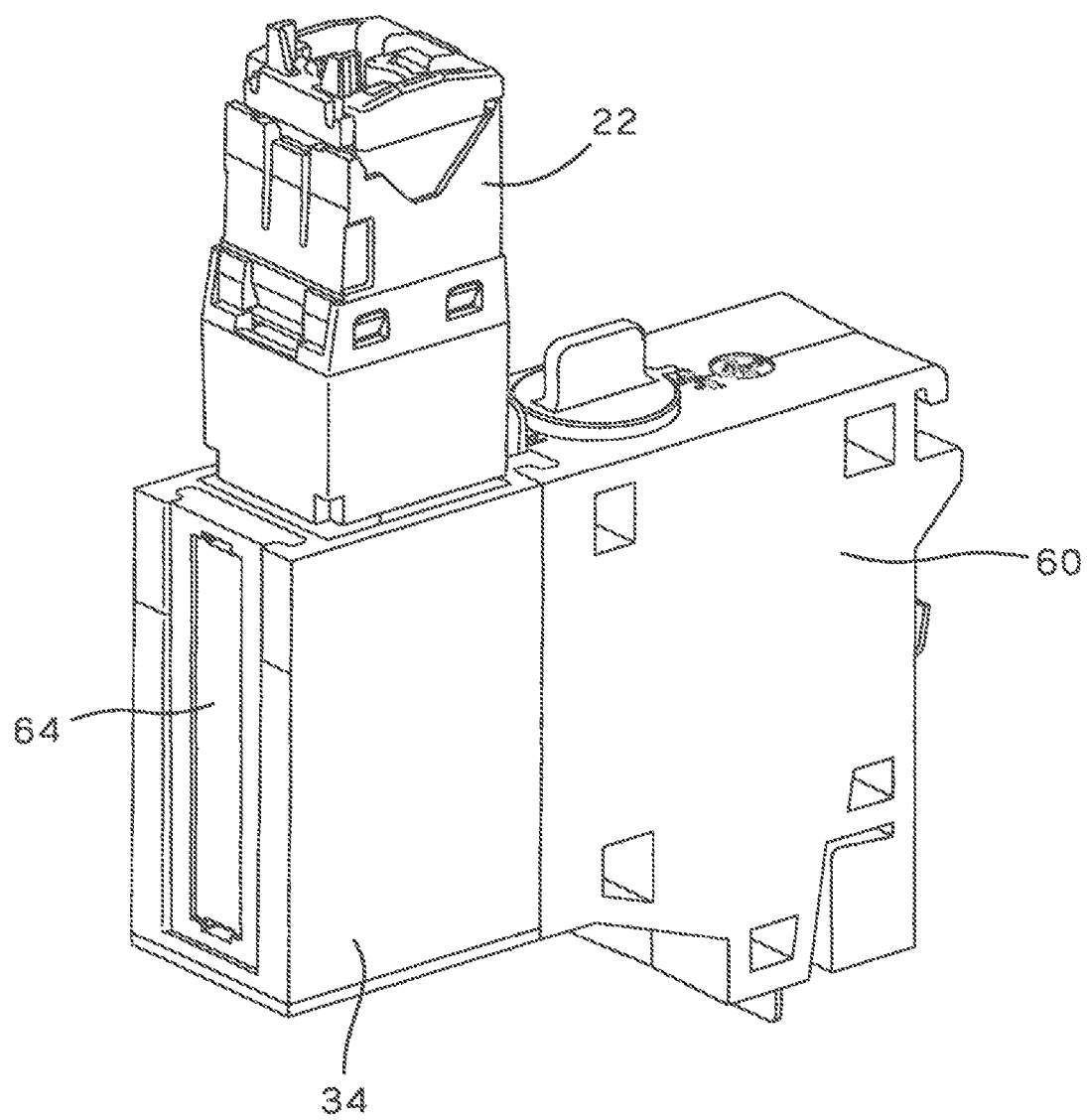

As shown particularly in FIGS. 2, 8 and 10, jack/module carrier 34, label holder 62, and an ultimate ID label cover 64 are part of jack module 34. The jack/module carrier 34 is slid down the front of the DIN rail sub-assembly 60. FIG. 9 shows a front partially exploded view of the assembly process. Carrier 34 and subassembly 60 use a tongue 66 and groove 68 style mounting for case of installation. Jack/module carrier 34 has a snap 70 on top that engages to a pocket 72 built into DIN rail sub-assembly 60. Label holder 62 slides into a similar tongue 74 and groove 76 and has a built in bump 78 that drops into a pocket 80 in the jack/module carrier 34. FIG. 10 shows a rear exploded perspective view of the hump 78 in the label holder 62 and the pocket 80 on the jack/module carrier. FIG. 11 shows a sectioned front perspective view of adapter 20 with the bottom pocket 82, carrier snap 84, and finger tab 86. FIG. 12 shows a front exploded, perspective view of the proper orientation of the jack/module 22 in the carrier 34. The label cover 64 snaps into the label holder 62. FIG. 10 shows an exploded view illustrating this. A jack/module 22 can be slid into the jack/module carrier 34. The jack/module carrier has a built in snap 31 that engages the bottom pocket 32 of any appropriately designed jack or module. It also has a finger tab 33 for quick removal.

Figure 13:
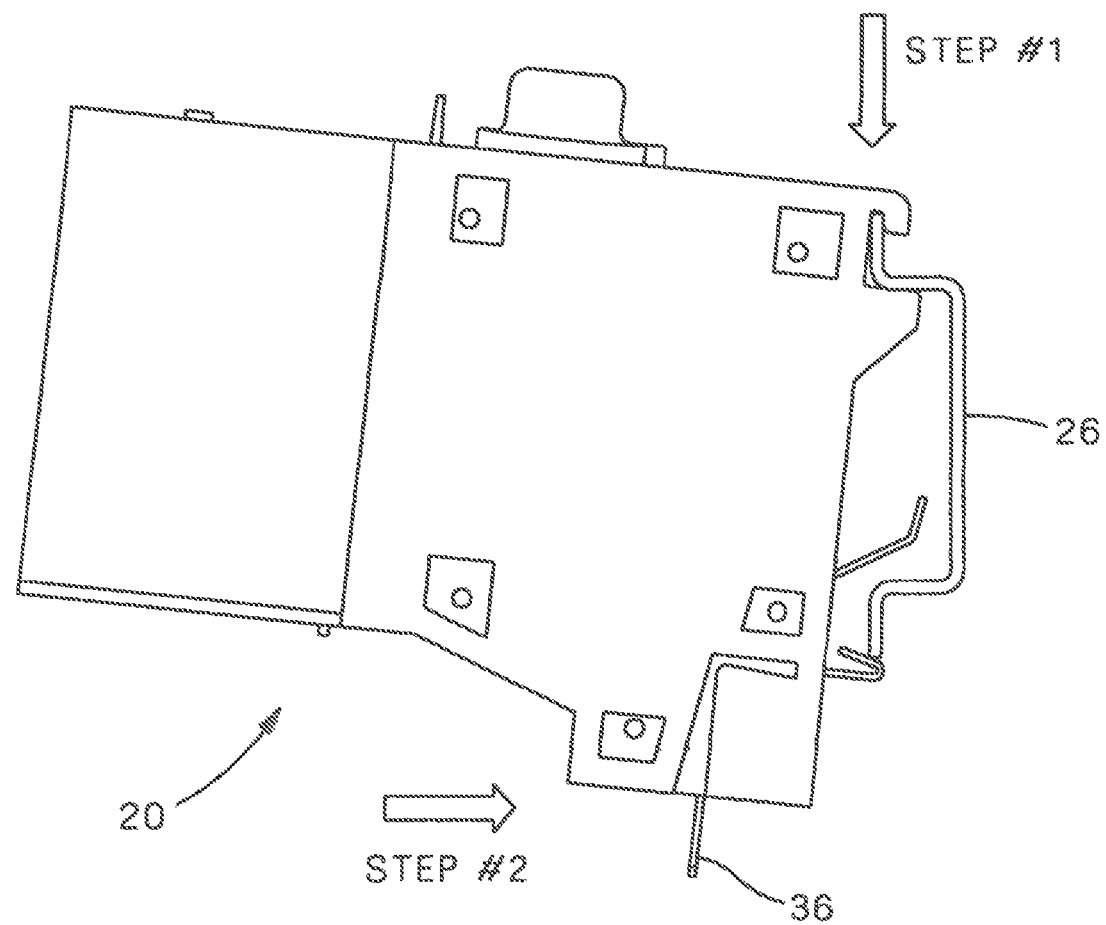

The complete assembly 20 will install by sliding over the top of a 35 mm DIN rail 26 and snap on the bottom edge using the latching arm 36 to hold it in place on the rail, as shown in FIG. 13.

Figure 14:
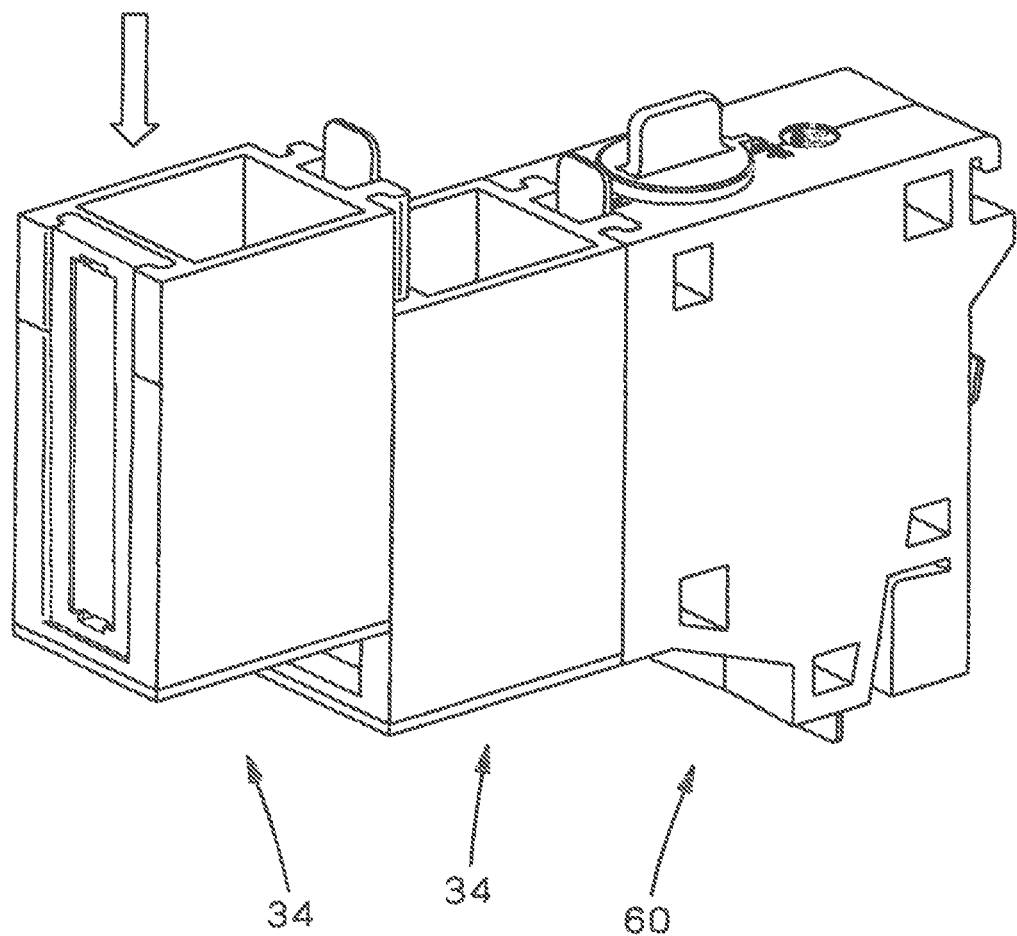

DIN rail adapter 20 is designed to accept a single position jack/module 22, but it can also have jack/module carrier 34 placed in the tongue and groove slot on the existing jack/module carrier 34, as shown in FIG. 14. The stacking of the jacks/modules increases density in the enclosure without the need to increase the footprint on the DIN rail.

Figure 15:
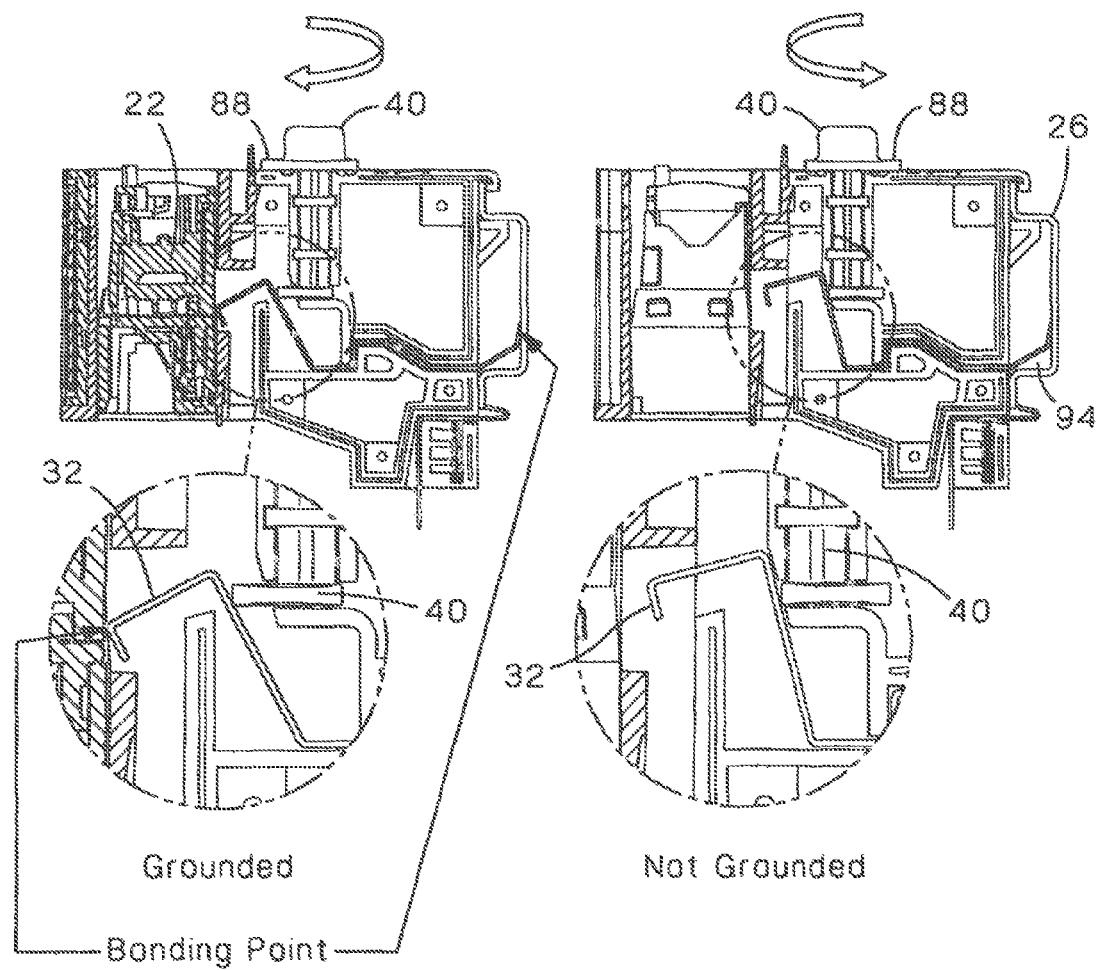

Referring more particularly to FIG. 15, cam turn tab 40 can be turned clockwise 180 degrees (or to 6 o'clock) to engage ground bar 32 to a jack/module 22 when a shielded jack is used and grounding is required. The cam turn tab 40 is designed to be easily turned by hand, without requiring the use of a tool. When the cam turn tab 40 is at 12 o'clock (see orientation in FIG. 4, and right top view in FIG. 17), the ground bar 32 is not engaged. Cam turn tab 40 has built in stops 88 which it engages so that it does not exceed the 180 degree rotation. In addition to the stops, the left and right housings 28, 30 have grooves 92A, 92B that the stop slides through until the end where it is forced to stop. The rear of the sub-assembly has a portion 94 of the ground bar protruding outward so that the ground bar touches the DIN rail 26 when installed. This will always be engaged into the DIN rail for grounding/bonding. In an additional embodiment, a jumper kit can be provided to connect ground to a second (or third, etc.) ganged carrier 34.

The invention claimed is:

1. A DIN rail adapter comprising:
an adapter sub-assembly, the adapter sub-assembly comprising a grounding bar and configured to mount to a DIN rail, the grounding bar and sub-assembly further configured to have the grounding bar make contact with the DIN rail when mounted;
a jack/module carrier, the jack module carrier configured to attach to the adapter sub-assembly; and
a cam turn tab, the cam turn tab configured to reversibly connect the grounding bar to a jack or module contained within the jack/module carrier wherein the cam turn tab reversibly connects the grounding bar to a jack or module contained in the jack/module carrier by pushing a portion of the grounding bar such that it makes contact with the jack or module contained within the jack/module carrier when the cam turn tab is rotated.

2. The DIN rail adapter of claim 1 wherein the jack/module carrier is connected to the adapter sub-assembly via a tongue and groove style mounting.

3. The DIN rail adapter of claim 2 further comprising a label-holder configured to mount to the jack/module carrier.

4. The DIN rail adapter of claim 3 wherein the label-holder mounts to the jack/module carrier via a tongue and groove style mounting.

5. The DIN rail adapter of claim 4 wherein the tongue and groove style mounting between the label holder and the jack/module carrier is of the same dimensions as the tongue and groove style mounting between the jack/module carrier and the adapter sub-assembly.

* * * * *